US009613537B2

(12) United States Patent
Meserole, Jr. et al.

(10) Patent No.: US 9,613,537 B2
(45) Date of Patent: Apr. 4, 2017

(54) MULTIPLE LANDING THRESHOLD AIRCRAFT ARRIVAL SYSTEM

(71) Applicant: The Boeing Company, Chicago, IL (US)

(72) Inventors: Jere S. Meserole, Jr., Bellevue, WA (US); Neil Planzer, Nantucket, MA (US)

(73) Assignee: THE BOEING COMPANY, Chicago, IL (US)

( * ) Notice: Subject to any disclaimer, the term of this patent is extended or adjusted under 35 U.S.C. 154(b) by 54 days.

(21) Appl. No.: 14/813,080

(22) Filed: Jul. 29, 2015

(65) Prior Publication Data

US 2017/0032683 A1 Feb. 2, 2017

(51) Int. Cl.

| | |
|---|---|
| ***G06F 19/00*** | (2011.01) |
| ***G06G 7/70*** | (2006.01) |
| ***G06G 7/76*** | (2006.01) |
| ***G08G 5/00*** | (2006.01) |
| ***G08G 5/02*** | (2006.01) |
| ***G08G 5/04*** | (2006.01) |

(52) U.S. Cl.
CPC ........... *G08G 5/0043* (2013.01); *G08G 5/025* (2013.01); *G08G 5/045* (2013.01)

(58) Field of Classification Search
CPC ....... G08G 5/0043; G08G 5/025; G08G 5/045
USPC ........................................... 701/1, 3–18, 122
See application file for complete search history.

(56) References Cited

U.S. PATENT DOCUMENTS

| | | | | |
|---|---|---|---|---|
| 5,374,932 | A * | 12/1994 | Wyschogrod | G08G 5/065 342/29 |
| 5,377,937 | A * | 1/1995 | LaMay | G05D 1/0676 244/185 |
| 5,519,618 | A * | 5/1996 | Kastner | G01S 13/91 701/120 |
| 7,302,318 | B2 * | 11/2007 | Gerrity | G08G 5/025 340/903 |
| 7,874,523 | B2 * | 1/2011 | Laporte | B64C 23/06 244/199.1 |
| 8,352,103 | B2 * | 1/2013 | Lewis | B64F 1/00 244/114 R |
| 8,521,340 | B2 * | 8/2013 | Coulmeau | G08G 5/0039 340/945 |
| 8,880,247 | B2 * | 11/2014 | Luckner | G08G 5/025 244/181 |
| 2006/0253232 | A1 * | 11/2006 | Gerrity | G08G 5/025 701/16 |

(Continued)

OTHER PUBLICATIONS

Helmke, Hartmut, et al. "Time-based arrival management for dual threshold operation and continous descent approaches." 8th USA/Europe ATM Seminar, Napa, CA, USA. 2009.

(Continued)

*Primary Examiner* — Jaime Figueroa
(74) *Attorney, Agent, or Firm* — MH2 Technology Law Group LLP

(57) ABSTRACT

A system and method for safe and effective implementation of approach procedures for guiding multiple aircraft of different weights approaching a single runway for landing, whereby lighter incoming aircraft will fly higher than heavier aircraft to avoid the wakes from the heavier aircraft, for the purpose of increasing the landing rate and, in turn, the number of aircraft that can land.

18 Claims, 5 Drawing Sheets

(56) References Cited

U.S. PATENT DOCUMENTS

| | | | | |
|---|---|---|---|---|
| 2011/0098872 | A1* | 4/2011 | Lewis | B64F 1/00 701/16 |
| 2012/0232723 | A1* | 9/2012 | Nance | B64C 25/00 701/5 |
| 2013/0204470 | A1* | 8/2013 | Luckner | G08G 5/025 701/18 |
| 2015/0239577 | A1* | 8/2015 | Lowe | B64F 1/00 244/114 R |
| 2016/0328982 | A1* | 11/2016 | Jeong | G08G 5/025 |

OTHER PUBLICATIONS

Flughafen Frankfurt AG, DFS, and Lufthansa, “HALS/DTOP—High approach landing system, dual threshold operation,” Flughafen Frankfurt AG, Deutsche Flugsicherung GmbH (DFS), Lufthansa, Frankfurt/Main, Germany, 1999.

Mauel, Frankfurt Airport Capacity Enhancement Program the Role of Wake Vortex Reducing Measures; 2nd WakeNet 2—Europe Workshop, 30.11-01.12.2004, Langen, Germany.

* cited by examiner

MULTIPLE LANDING THRESHOLD AIRCRAFT ARRIVAL SYSTEM

BACKGROUND

Field

The technology as disclosed herein relates generally to systems and methods for managing inbound aircraft and, more particularly, to systems and methods for safe approach and landing of aircraft of varied weight categories at multiple landing thresholds that are spaced a distance apart on a single runway at an airport.

Background

Air traffic continues to grow and capacity limitations at airports are resulting in flight delays. The capacity limitations, in part, are due to aircraft spacing requirements necessitated by wake turbulences created by leading, heavier aircraft that may be encountered by following, lighter aircraft, which limits how closely the following aircraft can be safely spaced behind leading aircraft during approach and landing. Specifically, aircraft that are approaching an airport to land are spaced by at least three to six nautical miles, depending on how light the following aircraft is in comparison to the leading aircraft, to allow the wake turbulence to dissipate.

Wake turbulence can be generated in the form of trailing vortexes from aircraft wings. The pair of vortexes created by each aircraft is a result of lift being generated by the wings and air rotating around the wing tip from the high pressure regions at the bottom of the wing to the lower pressure regions on the top of the wing. The strength of the vortexes is dependent on the instantaneous lift being generated by the wing and on the aircraft speed and configuration (stronger vortexes are generated at low aircraft speed). While there are ways to reduce the strength of the vortexes, they cannot be eliminated. The vortexes can severely buffet another aircraft that flies into them, and the vortexes from a heavy widebody transport aircraft can upend and destabilize a lighter weight narrow body transport aircraft following the heavier aircraft.

Present aircraft approach and landing spacing on a runway is established with the assumption of worst case conditions for wake vortex persistence in or near the flight path of a following aircraft. A set of Instrument Flight Rules (IFR) govern the management of commercial and many business aviation aircraft in most situations. In particular, for aircraft approaching a major airport, Air Traffic Control for the airport terminal area direct the aircraft pilots onto specific paths and specify speeds to merge the aircraft onto a single path for approach to a runway. This is done using rules for spacing the aircraft according to the weight categories of the leading and following aircraft.

In the United States, the Federal Aviation Administration ("FAA") labels aircraft weight categories as Small, Large, Heavy, and Super. Internationally, as defined by the International Civil Aviation Organization (ICAO), the aircraft weights are categorized as Light, Medium, Heavy, and Super. By way of illustration when describing the technology as disclosed herein, the term "heavier" will refer to aircraft in the Heavy and Super categories—namely, all the wide-bodies; and the term "lighter" will refer to aircraft that are in the small, light, medium or large categories, namely, narrow-body, regional, and business aircraft.

The normal minimum longitudinal spacing between aircraft of similar weight, or between any leading lighter aircraft and a heavier one following, is three (3) nautical miles in an airport terminal area during the initial phases of the approach to the runway. This minimum longitudinal spacing is usually set by "radar separation" rules. When a heavier aircraft is followed by a lighter aircraft a larger longitudinal spacing is required behind the heavier aircraft, as directed by "wake separation rules, which may be, for example up to six (6) nautical miles. This reduces the amount of aircraft that can land over a period of time ("the landing rate") on a single runway from the landing rate that can be achieved with approaching and landing aircraft of similar weights.

Aircraft follow a straight path on final approach to the runway, guided by a landing guidance system, for example, an Instrument Landing System (ILS). The ILS is a ground-based precision landing guidance system that provides lateral and vertical guidance to an aircraft following a landing flight path to land on a runway. The system uses radio signals to transmit guidance signals that along with high-intensity lighting arrays enable a safe landing, even when the visibility is poor. The actual names of the two components of the guidance signal from a landing guidance system are "glide slope" for the vertical component and "localizer" for the lateral component. The glide slope is the constant-angle, straight-line descent path that the aircraft is to follow to the landing zone on the runway just past the runway threshold. The angle of the glide slope is usually set at 3 degrees by the FAA. The ILS provides directional radio signals from the end of the runway that display on the aircraft cockpit instruments the proper direction and glide slope for the pilot to follow on descent to the runway landing threshold. The landing threshold is the line across the runway marking the nearest point to the physical end of the runway at which the aircraft is allowed to touch down on the runway. Most aircraft have an autopilot that can automatically follow the path specified by the ILS, should the pilot choose not to fly the approach manually.

Dual threshold approaches and landings have been proposed in which Air Traffic Control receives information about the arriving aircraft that includes the type and/or the weight category of each aircraft. Air Traffic Controllers are able to assign heavier aircraft to fly on a lower final approach flight path and lighter aircraft to fly on an upper final approach flight path by verbal instructions over a radio to the pilots. The aircraft then acquire the guidance from the landing guidance system for the assigned flight path and use the guidance to follow the assigned path, lower or upper, to the respective landing threshold. However, monitoring vertical separation is a challenge for Air Traffic Controllers making it impractical for Air Traffic Controllers to conduct dual thresholds final approaches and landing safely and economically. In addition, safely landing multiple aircraft of different weight categories on a single runway requires a system that provides notification to following aircraft of a deviation of a leading aircraft above its assigned vertical flight path during approach and landing. In addition, for each of the dual flight paths on final approach, a separate arrival route (lateral path over the ground), is required for aircraft of different weight categories to avoid wake encounters. Additional arrival routes are difficult to incorporate into the airspace around an airport.

Improved aircraft approaches to landing at airports, addressing the continued increase in air traffic and the runway capacity limitations at airports, are needed to prevent flight delays and increased costs.

SUMMARY

To protect lighter following aircraft from encountering the wake of a leading, heavier aircraft, on approach and landing on a single runway, one implementation of the technology is a system and method that direct heavier aircraft as they approach an airport for landing on a single runway into a lower flight path and direct lighter aircraft as they approach into an upper flight path, that may be up to 300 ft. higher than the lower flight path. The lighter and heavier aircraft are alternated in the upper and lower paths as appropriate. This eliminates the need for additional longitudinal spacing between a leading heavier aircraft and a following lighter aircraft for the purpose of wake avoidance. The system and method establishes and maintains a safe combination of longitudinal spacing and vertical separation of paths of incoming aircraft of different weights, while maximizing the landing rate at an airport. The system and method include monitoring the vertical components of the paths of the aircraft and alerting a following, lighter aircraft if there is a deviation of a heavier aircraft from its expected flight path, including a deviation resulting from the leading heavier aircraft executing a missed approach procedure (a "go-around"), that may cause the vertical separation between the paths to decrease to unsafe spacing, placing the lighter aircraft at risk of encountering the wake of the heavier aircraft.

The technology for implementing a multiple landing threshold aircraft arrival system for landing aircraft of different weight categories on a single runway during initial, intermediate and final approach can include an Approach and Landing Conformance Monitoring System component configured to determine conformance or deviance of aircraft from flight paths assigned by the Arrival Path and Sequence Advisor component, by using for example RADAR technology, and to alert operators of deviance of aircraft from an assigned flight path. The technology for implementing a dual threshold landing system can also include an Initial Approach Guidance System component configured to fly a leading heavier aircraft by transmitting the appropriate guidance signals on a lower flight path such that the actual path flown by the aircraft is vertically separated from the path flown by another following lighter aircraft flying on the upper path of the pair of lower and upper paths. The technology can also include a Final Approach and Landing Guidance System component configured to transmit signals to direct a leading heavier aircraft to fly a lower final approach flight path to a normal landing threshold for that aircraft or a following lighter aircraft to an upper final approach flight path with a glide slope the same as or steeper than that of the lower flight path to a displaced landing threshold, such that the actual flight path of each aircraft is vertically separated from the path flown by another aircraft having the same components that is directed to fly the other path of the pair of lower and upper final approach flight paths.

The Multiple Landing Threshold Aircraft Arrival system can be configured such that an Approach and Landing Conformance Monitoring System component includes a Path Modeler component configured to receive runway threshold assignments for an aircraft approaching an airport, based on aircraft weight category, and configured to determine a planned path of each aircraft, including the vertical guidance component of the path. The technology can also include a Conformance Monitor component operatively connected to the Path Modeler component and configured to determine a conformance or a deviation of the approaching aircraft from a predetermined planned vertical path for the aircraft during approach. The Multiple Landing Threshold Aircraft Arrival System can include an Alert Advisor component operatively connected to the Conformance Monitor component and configured to initiate one or more alerts to a following aircraft regarding deviation of a leading aircraft from its planned vertical path and configured to determine aircraft path corrections and advise of needed path corrections. An Automatic Alert to Aircraft component configured to automatically provide alerts to aircraft.

The Multiple Landing Threshold Aircraft Arrival System can be configured where the Initial and Final Approach Guidance Systems includes an Assignment Recorder component on an aircraft configured to receive transmissions from Air Traffic Controllers containing directives to aircraft specifying arrival speeds and tracks to establish the aircraft arrival sequence and also initial and final upper and lower approach paths.

A Path Modeler component on the aircraft can be configured to receive runway threshold assignments based on aircraft weight category, and configured to determine a planned flight path of the aircraft, including the vertical guidance component of the path. A Navigator component on the aircraft can operatively be connected to the Path Modeler component and configured to continuously determine aircraft position and compare the aircraft position with the mathematical representation of the flight path to create steering guidance for flying the aircraft along the directed flight path. A Pilot/Autopilot component on the aircraft operatively connected to the Path Navigator component and configured to follow the steering guidance for flying the aircraft along the directed flight path.

The Multiple Landing Threshold Aircraft Arrival technology can include, an Alert Advisor component configured to issue a missed approach alert to a following lighter aircraft based on a missed approach indication generated by a leading aircraft. The Alert Advisor component can include a wake propagation modeler, operatively connected to the Conformance Monitor component and Alert Advisor component, and configured to modify the Alert Advisory component to adjust for wake propagation using current atmospheric conditions.

The technology can include an Arrival Path and Sequence Advisor component configured to assign arriving pairs of aircraft appropriately by weight to lower and upper flight paths and order them for optimal spacing between arriving aircraft for landing sequentially on a single runway. The Arrival Path and Sequence Advisor component can be further configured to advise clearances for each aircraft's speed along an upper or lower path depending on aircraft weight category during approach to the airport.

This technology as disclosed herein solves the problem of the reduction in the aircraft landing rate that results when there are aircraft of different weights approaching an airport and specifically permits multiple aircraft of different weight categories to land on a single runway without requiring additional longitudinal spacing. The technology as disclosed is a system and method for maintaining the maximum landing rate when the traffic is mixed with different weight aircraft, without increasing the risk of wake encounters.

One implementation of the technology is a multiple threshold system for landing aircraft at multiple landing threshold on a single runway including at least two guidance signals, where each guidance signal is for a different weight category of aircraft, and the signal is being communicated to an aircraft arrival system, where the guidance signals are different for each of the different weight category of aircraft and where the guidance signals includes a lateral and vertical guidance (glide slope) component. The guidance signals can define a different approach and landing path for a single runway for each weight category of aircraft, where each path has a different glide slope and landing threshold for each weight category of aircraft, and further can define a selectively variable vertical separation to be maintained between aircraft of different weight categories. The technology can further include an Arrival Path and Sequence Advisor configured to sequence the arrival of aircraft of different weight categories.

One implementation can include a path modeler operatively configured to receive runway threshold assignments for multiple aircraft approaching an airport, based on aircraft weight category, and configured to determine a planned path of each aircraft, including the vertical guidance component of the path. The technology can further include a conformance monitor operatively connected to the path modeler and configured to determine a conformance or a deviation of each approaching aircraft from a predetermined planned vertical path for the aircraft during approach. An alert advisor operatively can be connected to the conformance monitor and configured to initiate one or more alerts to a following aircraft regarding deviation of a leading aircraft from its planned vertical path and configured to determine aircraft path corrections and advise the forward aircraft and a following lighter aircraft of the path corrections.

The multiple threshold system as disclosed herein, in one implementation can include a wake propagation modeler, operatively coupled to the conformance monitor and alert advisor, and configured to modify an alert advisory to adjust for wake propagation using current atmospheric conditions. An Arrival Path and Sequence Advisor is configured to advise clearances for each aircraft's path to select upper and lower paths depending on aircraft weight category during approach to the airport. The clearance advisor can be further configured to advise clearances for each aircraft's speed along an upper or lower path depending on aircraft weight category during approach to the airport.

This technology can be implemented by operating two or more precision landing guidance systems for a single runway. For instance, a second precision landing guidance system could provide an approach-to-landing flight path above the usual ILS glide slope, all the way to a touchdown point displaced some distance down the runway past the usual landing threshold. The second system could be another ILS or the newly available, less costly, Global Positioning System (GPS) Landing System (GLS) or Lateral Performance with Vertical (LPV) system, or some other comparable system. Also, one implementation could include runway markings and lighting at the second, displaced threshold. Further, the precision landing guidance system for the first threshold need not be an ILS, but could also be a GLS or LPV, or some other comparable system.

An aircraft's flight management system can receive and execute the aircraft's approach and landing flight path, including the altitude profile, and a Path Modeler component can be included on the ground or on board the aircraft, which can make a predictive model of the flight path of an aircraft in three dimensions—laterally and vertically—based on the aircraft positional inputs and wind and temperature forecasts and/or inputs from onboard sensor systems, including positional, wind and temperature sensors. A Conformance Monitor component compares the actual path of the aircraft with the predictive model of the assigned path for that aircraft as provided by the Path Modeler, and if the aircraft deviates from the predictive model of the path, an Alert Advisor component can issue an alert.

One implementation of the technology as disclosed is a system that executes a process for notifying a following lighter aircraft when a leading heavier aircraft deviates above its planned flight path, including, in particular, the special case when the leading aircraft executes a missed approach procedure). The notification provides a safety provision, which protects against situations where the pilot of the leading, heavier aircraft cannot, or does not, announce the deviation over the air traffic control radio, or the pilot of the following, lighter aircraft does not hear the pilot's announcement from the heavier aircraft. The system can employ a modified Traffic Collision Avoidance System (TCAS) unit at the airport to notify the following pilot through the TCAS unit on the aircraft.

Another implementation of the technology includes a method that provides alerts for deviations of a leading aircraft above its assigned vertical flight path during approach and landing.

The features, functions, and advantages that have been discussed can be achieved independently in various implementations or may be combined in yet other implementations, further details of which can be seen with reference to the following description and drawings.

These and other advantageous features of the present technology as disclosed will be in part apparent and in part pointed out herein below.

BRIEF DESCRIPTION OF THE DRAWINGS

For a better understanding of the present technology as disclosed, reference may be made to the accompanying drawings in which.

Figure 1:
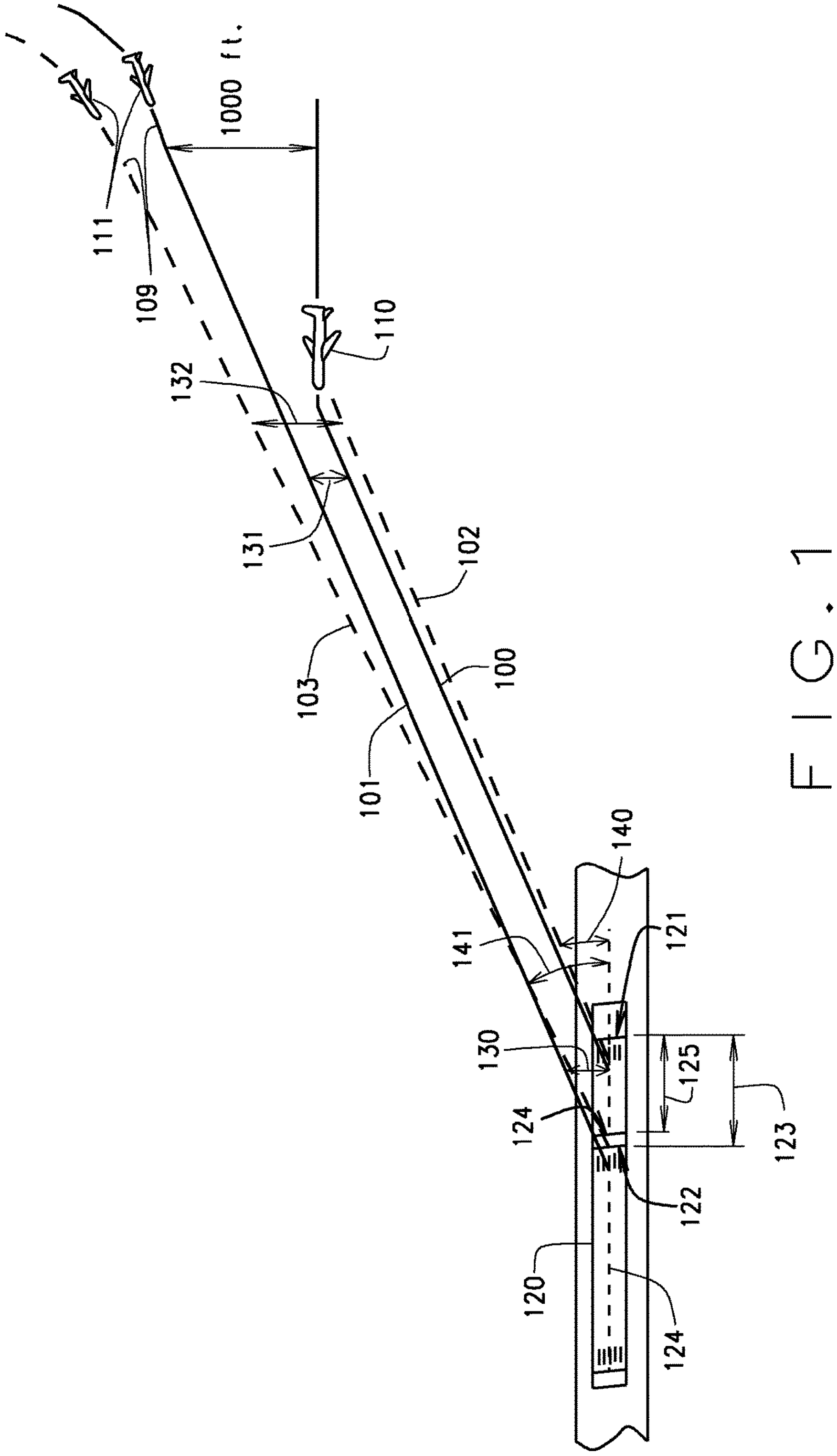
FIG. 1 is an illustration of a dual landing threshold final approach to a single runway in an implementation of the invention.

While the technology as disclosed is susceptible to various modifications and alternative forms, specific implementations thereof are shown by way of example in the drawings and will herein be described in detail. It should be understood, however, that the drawings and detailed description presented herein are not intended to limit the disclosure to the particular implementations as disclosed, but on the contrary, the intention is to cover all modifications, equivalents, and alternatives falling within the scope of the present technology as disclosed and as defined by the appended claims.

DETAILED DESCRIPTION

The multiple landing thresholds aircraft arrival system as disclosed provides systems and methods for safely landing incoming aircraft in multiple fight paths during initial approach to an airport and during final approach and landing on a single runway. The technology enables an increased landing rate for aircraft of different weight categories on a single runway by permitting only a three-mile longitudinal spacing between a leading heavier aircraft and a following lighter aircraft, rather than the typical five- or six-mile longitudinal spacing requirements. The aircraft are vertically separated with the heavier aircraft flying in a lower flight path touching down at a typical landing location ("landing threshold") and the following, lighter aircraft flying in an upper flight path touching down as much as three to five thousand feet further down the runway ("displaced landing threshold"). As used herein "approach and landing" includes both the initial approach to the airport and the subsequent final approach to and landing on the runway. Aspects of each part of the approach and landing are referenced herein.

Lighter aircraft flying on an upper flight path vertically separated above the lower flight path taken by a leading, heavier aircraft by up to 300 ft., will not require additional longitudinal spacing between aircraft. Aircraft wakes will naturally sink and move apart horizontally over time, and headwinds, which are usual on final approach, blow wakes downwind underneath the final approach descent path. Directing the lighter aircraft to fly above the path taken by the leading, heavier aircraft avoids the need to space the lighter aircraft further than three miles behind the heavier aircraft to ensure that lighter aircraft safely avoids the wake of the heavier aircraft. The present technology as disclosed addresses both safety and workload considerations, as well as measures to improve flight efficiency, specifically in the context of flying under instrument flight rules.

The multiple thresholds aircraft arrival system establishes and maintains proper, safe separation in two dimensions simultaneously (longitudinal and vertical), instead of in just one dimension (longitudinal). Under Instrument Flight Rules (IFR), Air Traffic Controllers are responsible for maintaining safe separation between arriving aircraft. Typically they monitor separation with radar surveillance, and maintain the longitudinal spacing between arriving aircraft on a given approach path, while all approach and departure paths are separated either horizontally by at least three miles or vertically by at least 1000 ft. For multiple thresholds approaches, the necessary monitoring and control of closer vertical separations between the paths of arriving aircraft would place added responsibility on Air Traffic Controllers. The task of establishing and maintaining proper separation in two dimensions simultaneously is cognitively highly challenging for a controller. The present technology as disclosed is an improvement to current automation that assists Air Traffic Controllers, providing a practical solution for multiple aircraft of different weight categories arriving to land on a single runway with only three miles of longitudinal spacing behind every aircraft.

At many airports with high traffic density, it is challenging to add additional approach routes to allow multiple streams of traffic to land on a single runway. Implementation of the technology as disclosed provides systems and methods for avoiding a need for additional approach routes while increasing landing rates at an airport. The technology as disclosed is a system and method for safe and effective implementation of guiding multiple aircraft of different weight categories approaching a single runway for landing at an airport, into vertically separated flight paths approaching the airport. During initial approach to an airport, leading, heavier incoming aircraft can be directed to fly on a lower flight path, and any following lighter aircraft are directed to the upper flight path. The lower flight path for the leading, heavier aircraft has a vertical "ceiling" limitation (highest altitude of path) to maintain sufficient vertical separation from a following, lighter aircraft in the upper flight path, and can lead to the usual runway threshold, while the upper flight path for the following, lighter aircraft has a vertical "floor" limitation (lowest altitude of path) and leads to a second, displaced landing threshold further down the runway. Additional flight paths can be added above the uppermost flight path, by layering, i.e. vertically separating the flight paths with a combination of vertical floor and ceiling limitations resulting in thresholds displaced further down the runway. If three or more flight paths are implemented, any flight paths that have a flight path above and below will have a vertical ceiling and floor limitation. The lower path may be the conventional flight path, i.e. the flight landing path that would be used but for the current technology as disclosed. When landing aircraft of similar weight categories, or a lighter leading aircraft followed by a heavier aircraft, normal landing procedures are used, in which case the incoming aircraft can all use the lower, conventional flight path.

Thus the technology as disclosed provides the ability to guide incoming aircraft flying into multiple flight paths to a single runway using existing approach lateral paths ("routes") for the runway, to allow, for example, for two vertically separated flight paths of aircraft approaching a single runway on a single route. These two vertically separated flight paths, for example, feed into two separate final approach to landing flight paths (lower and upper), that lead to two separated landing threshold touchdown points on a single runway. In particular, these two paths are vertically aligned on a common route, and a specified vertical separation can be established well prior to an aircraft arrives at its final approach to an airport.

The details of the technology as disclosed and various implementations can be better understood by referring to the figures of the drawing. According to the implementation(s) of the present technology as disclosed, various views are illustrated in FIGS. 1-5, and like reference numerals are being used consistently throughout to refer to like and corresponding parts of the technology for all of the various views and figures of the drawing. Also, please note that the first digit(s) of the reference number for a given item or part of the technology should correspond to the Figure number in which the item or part is first identified.

Referring to FIG. 1, the specific example provided is that of a dual landing threshold final approach and landing of aircraft. The figure illustrates two ("dual") final approach and landing flight paths 100 and 101 for incoming aircraft, separated in altitude by a vertical distance 131, which is less than 300 feet. Two precision landing guidance systems, such as a ground-based ILS for the conventional landing threshold, and another ILS or another system such as a GLS, for the displaced landing threshold 122 to be used by the following aircraft, provide guidance for two aircraft, heavier aircraft 110 and lighter aircraft 111 to fly on final approach 109 and landing flight paths 100 and 101, in which heavier aircraft 110 and lighter aircraft 111 are flying, respectively, are separated in altitude by vertical distance 131, when landing the aircraft at landing thresholds 121 and 122, separated by distance 123 along the centerline 124 of the runway 120. Although dual final approach and landing flight paths; i.e., an upper path 101 and a lower path 100 are depicted in FIG. 1, additional paths with corresponding landing guidance systems may be implemented above the upper path 101 by layering the paths. For example, a third path may have its landing threshold displaced further down the runway than that of the upper path landing threshold 122 shown in FIG. 1.

At a minimum, the longitudinal distance 123 is sufficient to locate the displaced landing threshold 122 past the furthest point at which the heavier aircraft 110 flying along the lower flight path 100 would normally touch down on runway 120 (the "conventional" landing threshold). At the point of nose wheel touchdown the heavier aircraft 110 ceases to create wake vortexes. Similarly, if there is a third flight path (not shown), above the upper flight path 101 shown, the aircraft flying on that third flight path will be lighter than the aircraft 111 that flies on the upper flight path 101, and the landing threshold for the third flight path is displaced far enough down the runway to be past the furthest point at which the aircraft 111 flying along the upper flight path 101 would normally touchdown. In the arrival system, an Arrival Path and Sequence Advisor 320 (FIG. 3) determines the appropriate landing thresholds for each aircraft in each flight path and conveys this information to Air Traffic Controllers, as described in greater detail below.

Referring to FIG. 1, an implementation of the system and method establishes separate angles of descent 140 and 141 from the runway centerline 124 for aircraft 110 and 111 in the lower and upper final approach flight paths 102 and 103. The two landing guidance systems for the two flight paths 102 and 103 can provide guidance to each aircraft for glide slopes that have the separate angles of descent 140 and 141. Specifically, the implementation can provide a glide slope with a larger angle of descent 141 for the aircraft in the upper path 103 than the angle of descent 140 of the glide slope for the aircraft in the lower path 102. Typically, for most runways the landing guidance system is set to provide guidance for a glide slope with an angle of descent of about 3 degrees. The angle of descent 141 for the upper flight path 103 in the dual threshold aircraft arrival system can reasonably be set as much as approximately one degree more, up to approximately 4 degrees or slightly higher. The angle of descent 140 for the lower flight path 102 can reasonably be set as much as approximately a half degree less, down to about 2.5 degrees. As an example, the angle 141 can be set at 3.5 degrees, and the angle 140 kept at 3 degrees. As another example, the angle 141 can be set at 3.8 degrees, and the angle 140 at 2.8 degrees. As a result, a lesser displacement 125 of the second landing threshold 124 is required to achieve a minimum required value for the vertical separation 130 above the point of touch down of heavier aircraft 110 following the final approach path 102. This is a direct consequence of the geometry of the flight paths 102 and 103 and the landing thresholds 121 and 124. The distance 125 of the second landing threshold 124 from the first landing threshold 121 is a function of angle 141. In addition, there will be reduced fuel consumption by lighter aircraft 111 when it follows a glide slope with an angle of descent that is greater than 3 degrees.

Figure 2:
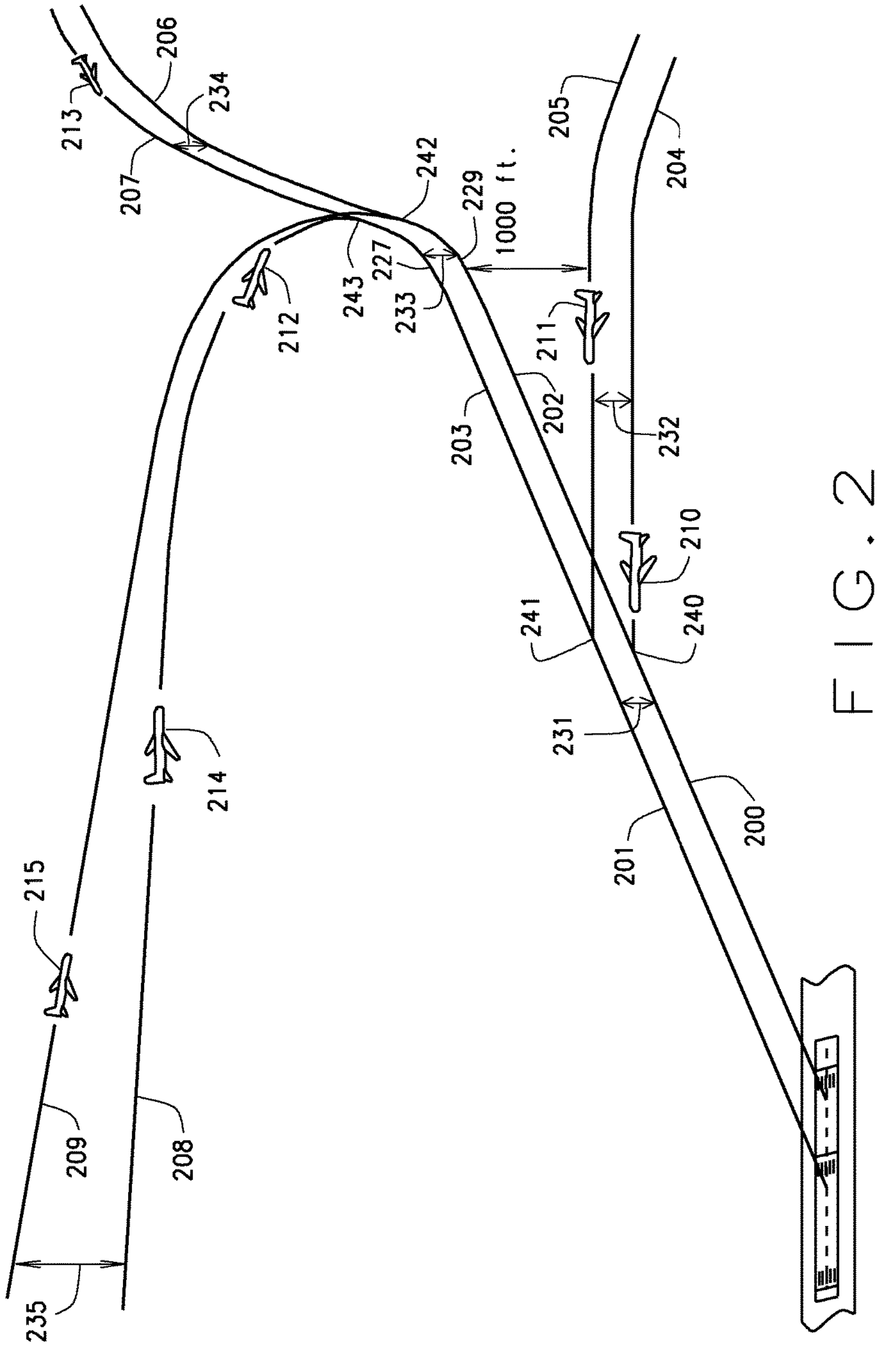
FIG. 2 is an illustration of an implementation of dual landing threshold initial and final approaches to a single runway with pairs of vertically separated flight paths from multiple routes.

For simplicity in description henceforward, a specific implementation of the Multiple Landing Thresholds Aircraft Arrival System 300 for dual landing threshold arrival, approach, and landing is described, although all the teachings provided for dual thresholds apply to implementation of three, or more, landing thresholds. The approach of an aircraft to a runway has three segments: an initial approach, an intermediate approach and a final approach. The final approach segment is from the final approach point ("FAP") which is the point at which the aircraft intercepts the glide slope. Before the final approach is the intermediate approach segment, where the aircraft aligns with the final approach segment. The initial approach segment precedes the intermediate approach segment. Referring to FIG. 2, the final approach to the runway is from the FAP at 240, 241 and 227, 231, to landing. Preceding the final approach, the intermediate approach segment is where aircraft 210, 211 and 212 are shown in FIG. 2, and at numerals 204, 205, 206 and 207. Preceding the intermediate approach segment is the initial approach segment, where aircraft 213, 214 and 215 are depicted. For the purposes of this description, the initial and intermediate approaches are combined and referred to as the "initial approach."

The dual threshold approach and landing paths as seen in FIG. 1 for the final approach may be extended to use new flight procedures prior to the final approach, i.e. during initial approach. These new procedures may be used from any point in the descent to the runway, but not later than the point at which the longitudinal spacing between the aircraft becomes less than the spacing required for wake avoidance (e.g., 6 miles). As illustrated in FIG. 2, these procedures may be specifically designed to be implemented in multiple pairs of vertically layered lower and upper flight paths (204 and 205, 206 and 207, and 208 and 209). Each pair of flight paths constitutes a "route," with heavier aircraft in the lower flight path of each pair of paths and lighter aircraft in the upper flight path of each pair of paths, from different directions of approach to the runway that lead to and seamlessly connect into outermost final approach flight paths 202 and 203 and innermost final approach flight paths 200 and 201. The pairs are designed such that when they are implemented a minimum vertical separation 232, 233, and 234 between the flight paths in each pair is maintained. The vertical separation between upper and lower flight paths will begin, at the latest, at the point in the initial approach to the runway at which longitudinal spacing becomes less than the largest regulatory required wake-based spacing for the particular leading heavier and following lighter aircraft that fly into the airport. The spacing naturally decreases during the approach due to the compression of the spacing that occurs as the aircraft reduce speed.

The flight paths in each pair can be designed such that the vertical separation between the paths is variable, i.e. decreasing as the distance to landing decreases, rather than fixed, as long as it is never less than the specified minimum vertical separation. For instance, as illustrated in FIG. 2, the vertical separation between the flight paths in the pair 208 and 209 can start at a value 235 that can be greater than 1000 ft., and steadily decrease to a smaller value 233 on final approach, that can be less than 300 ft. as determined by the Multiple Threshold Landing Aircraft Arrival System, and that provides the same vertical separation 231 between the final approach flight paths 200 (lower) and 201 (upper). This implementation naturally accommodates the difference in aerodynamic characteristics between heavier aircraft and lighter aircraft and the need to conserve fuel. Generally, heavier aircraft are optimized for much longer flight ranges than lighter aircraft, and in an optimal, fuel-conserving descent at idle, or near-idle thrust they will glide at a shallower flight path angle than will lighter aircraft, as shown by the different descent angles of paths 208 and 209 in FIG. 2. To enter the initial approach paths 208 and 209 with a large initial vertical separation 235, two aircraft 214 and 215 that have come to the airport from the same direction will begin their descents from cruise altitude at different distances from the airport. Specifically, heavier aircraft 214 will have begun descending farther from the airport than lighter aircraft 215. This minimizes the fuel consumed by each of the aircraft 214 and 215.

For aircraft approaching an airport in a direction different from the direction of the single runway, i.e. at an angle to the runway, the Multiple Landing Threshold Aircraft Arrival System can establish the vertical separations of the aircraft prior to the point in the landing flight path where the aircraft turns to align with the direction of the runway. This point is referred to herein as the "merge point" of the path. In the implementation depicted FIG. 2, the system provides pairs of merge points (240 and 241, 242 and 243) so that the aircraft of similar weight categories continue on the assigned flight path (upper or lower) for their weight categories, while maintaining safe vertical separation between the upper and lower flight paths, This avoids the need for multiple, separate lateral flight routes for the heavier and the lighter aircraft.

FIG. 2 further depicts lower initial approach flight path 206 joining with lower initial approach flight path 208 at merge point 242, with the conjoined path then turning onto the outer segment 202 of lower final approach flight path 200. Also, lower initial approach flight path 204 joins the lower final approach flight path 200 at merge point 240. Similarly, the example shows upper initial approach flight path 207 joining with upper initial approach flight path 209 at merge point 243, with the conjoined path then turning onto the outermost portion 203 of upper final approach flight path 201. As well, upper initial approach path 205 joins the upper final approach path 201 at merge point 241.

In the implementation shown in FIG. 2, the landing order of the aircraft is 210 through 215, in numerical order. At the pairs of merge points, each aircraft is 3 nautical miles (nm) longitudinally behind the one preceding it. Then, on the innermost portion of the final approach flight paths 200 and 201, after the pair of merge points 240 and 241, this spacing compresses to 2.5 nm, as the aircraft slow to landing speed. In particular, in this implementation, the heavier aircraft 212 will follow 3 nm behind lighter aircraft 211, and then at the merge point 243 the lighter aircraft 213 will follow 3 nm behind the heavier aircraft 212. Also, when the heavier aircraft 214 arrives at merge point 242, it will be 3 nm behind lighter aircraft 213, and lighter aircraft 215 will continue to follow 3 nm behind heavier aircraft 214 as they pass through the pair of merge points 242 and 243.

Figure 3:
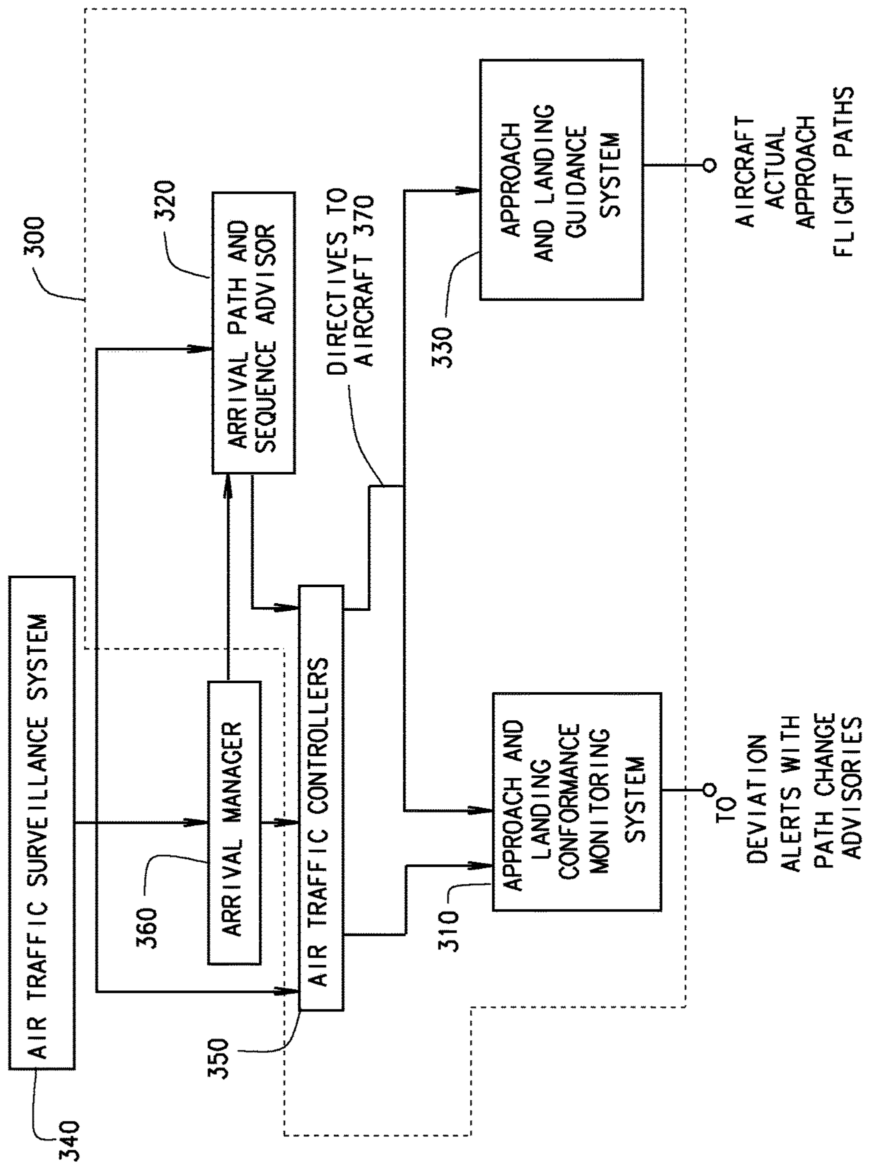
FIG. 3 is an illustration of a functional diagram of a multiple landing threshold aircraft arrival system.

Referring to FIG. 3, an implementation of a Multiple Landing Threshold Aircraft Arrival System 300 is depicted. For simplicity in description a specific implementation of the Multiple Landing Thresholds Aircraft Arrival System 300 for dual landing threshold arrival, approach, and landing is described, although all the teachings provided for dual thresholds apply to implementation of three, or more, landing thresholds. The Multiple Landing Threshold Aircraft Arrival System 300 comprises an Approach and Landing Conformance Monitoring System 310; an Arrival Path and Sequence Advisor component 320, an Approach and Landing Guidance System 330; and an Arrival Manager component 360. This system 300 provides automated assistance to Air Traffic Controllers 350 for conducting dual threshold final approaches and landings with a single angle of descent as in FIG. 1. Alternatively, these systems provide automated assistance to Air Traffic Controllers 350 for implementing multiple pairs of vertically separated paths in the initial approach as in FIG. 2, and further by implementing multiple descent angles 140 and 141 in the final approach, as in FIG. 1 (dashed lines). The System 300 is configured to receive information containing arriving aircraft types, positions, and flight plans from a traditional Air Traffic Surveillance System 340. This is the same information that the Air Traffic Controllers 350 currently use to direct arriving aircraft to the runway to land. The Arrival Path and Sequence Advisor 320 augments existing Arrival Manager 360 automation that assists the Air Traffic Controllers 350 with sequencing and spacing the arriving aircraft, which come to the airport from all directions, as described further in detail below.

The Arrival Path and Sequence Advisor component 320 can be configured to receive information from an existing Air Traffic Surveillance System 340 about each arriving aircraft, including its weight category and its arrival route, i.e. the lateral track over the ground that an aircraft is assigned to fly, and to receive a baseline landing sequence for the arriving aircraft created by existing Arrival Manager component 360, without regard to the weight categories of the aircraft. The Arrival Path And Sequence Advisor component 320 can then assign the arriving aircraft appropriately by weight to lower and upper flight paths and can order them in an optimal sequence so that, if at all possible, no pair of leading and following aircraft invokes an FAA or ICAO wake separation rule requiring the spacing behind any leading aircraft to be more than three miles. An advantage of this technology as disclosed is that a lighter aircraft in the upper flight path that is following an aircraft of any weight category in the lower flight path is always spaced only three miles behind the preceding aircraft in the lower flight path. With the arrival route information software in the Arrival Path and Sequence Advisor 320 can define lower and upper flight paths along all routes that, as shown in FIG. 2, each connect to the lower and upper, respectively, final approach and landing flight paths 200 and 201 for the runway, while smoothly joining the lower and upper flight paths of other routes at the merge points 242 and 243, and 240 and 241. The lower flight paths 204, 206, or 208 can be defined with specifications of “at or below” altitudes (“ceilings”) at each of the waypoints, or lateral geometric coordinates, used to define the route, and the upper flight path 205, 207, or 209 can be defined with specifications of “at or above” altitudes (“floors”) at each of the waypoints. The difference between the altitudes thus specified for the ceiling of the lower path and altitudes thus specified for the floor for the upper path can be the minimum required vertical spacing that matches the vertical spacing 231 between the final approach lower and upper flight paths to the runway. The difference can also, as discussed before, vary from a larger value, as much as 1000 ft. or more, early in the route and then during the initial approach decrease to the vertical spacing at the beginning of the final approach.

The altitude specifications that define the lower and upper flight paths can be created by software in the Arrival Path and Sequence Advisor component 320 for any currently used aircraft routes at various airports, taking into account environmental conditions and surveillance information, including traffic, and evaluating whether the altitude profiles for the aircraft’s descent are flyable by the aircraft. Alternatively, the specifications can be drawn from a database complied for pre-calculated lower and upper flight paths for the routes.

The altitude specifications that define the lower and upper flight paths can be created by software in the Arrival Path and Sequence Advisor 320 component for any currently used aircraft routes at various airports, taking into account current winds and traffic and confirming that the altitude profiles for the aircraft’s descent are flyable by the aircraft. Alternatively, the specifications can be drawn from a database complied for pre-calculated lower and upper paths for the routes.

The Arrival Path and Sequence Advisor 320 can assign the arriving aircraft appropriately by weight to lower and upper flight paths and can order them in an optimal sequence so that, if at all possible, no pair of leading and following aircraft invokes an FAA or ICAO wake separation rule requiring the spacing behind any leading aircraft to be more than three miles. An advantage of this technology as disclosed is that a lighter aircraft in the upper flight path that is following an aircraft of any weight category in the lower flight path is always spaced only three miles behind the preceding aircraft in the lower flight path.

The Arrival Path and Sequence Advisor 320 can be configured to receive information about each arriving aircraft, including its weight category and its arrival route, i.e. the lateral track over the ground that an aircraft is assigned to fly, and to receive a baseline landing sequence for the arriving aircraft created by existing Arrival Manager automation 360, without regard to the weight categories of the aircraft. With the arrival route information, software in the Arrival Path and Sequence Advisor 320 can define lower and upper paths along all routes that, as shown in FIG. 2 each connect to the lower and upper, respectively, final approach and landing paths 200 and 201 for the runway, while smoothly joining the lower and upper paths of other routes at the merge points 242 and 243, and 240 and 241. The lower path 204, 206, or 208 can be defined with specifications of "at or below" altitudes at each of the waypoints, or lateral geometric coordinates, used to define the route, and the upper path 205, 207, or 209 can be defined with specifications of "at or above" altitudes at each of the waypoints. The difference between the altitudes specified for the lower path and those for the upper path can be the minimum required vertical spacing that matches the vertical spacing 231 between the final approach lower and upper paths to the runway. The difference can also, as discussed before, vary from a larger value, as much as 1000 ft. or more, early in the route and then during the initial approach decrease to the final vertical spacing at any point prior to or at the final approach.

The Arrival Path and Sequence Advisor 320 can also contain an aircraft wake separations matrix of the aircraft weight categories and wake separation requirements, which determines the aircraft to be categorized as heavier and those to be categorized as lighter, with the meaning of those terms being the same as generally used heretofore in this description. The Arrival Path and Sequence Advisor 320 can contain an algorithm that executes a function to assign the heavier aircraft to the lower flight paths and the lighter aircraft to the upper flight paths. The algorithm can further examine the baseline landing sequence for instances where the wake separation rules require a spacing between two aircraft to be more than three miles; for example, when there are two heavier aircraft in a row in the landing sequence and the combination of aircraft types is such that four miles of longitudinal spacing is needed between them. For these instances, the algorithm can optimize the landing sequence, by directing a lighter aircraft on a flight path in between the two heavier aircraft. To do so, it can assign timing for the lighter aircraft and one of the heavier aircraft that retards one during the early arrival and advances the other, and it can create advisories for speed changes and/or path stretching or shortening that the Air Traffic Controllers 350 can use to execute the revised landing sequence. The Arrival Path and Sequence Advisor component 320 is further configured to establish the landing sequence, lower and upper paths speeds and tracks.

Alternately, if there is not a lighter aircraft near the two heavier aircraft in the landing sequence, and if, for example, the leading aircraft is a super heavy A380 or B747 and the following aircraft is a smaller Heavy aircraft such as an A330 or B787, the optimizer algorithm can change the order of the two heavier aircraft, placing the smaller Heavy aircraft as the leading aircraft, and thereby allow a three-mile spacing between them. Similarly, if there are two lighter aircraft in a row in the baseline sequence where the leading one is a Medium aircraft and the second is a Light aircraft that requires more than three miles spacing behind the leading aircraft, the optimizer algorithm can move a heavier aircraft in between them in the order, if possible, or change the order of the two lighter aircraft, by placing the lightest aircraft as the leading aircraft, if a heavier aircraft or a another light aircraft immediately precedes them. Furthermore, in this case, if a third aircraft immediately precedes the two lighter aircraft in question is the lightest, the optimizer algorithm can reassign the first of the two aircraft in question to the lower path, since the leading aircraft is a lighter aircraft, not a heavier one, and no revision to the landing order is made.

The Approach and Landing Conformance Monitoring System 310, monitors the actual flight paths flown by the aircraft to detect any deviations by aircraft from the assigned paths and, in the event of a deviation, to alert Air Traffic Controllers 350 and the aircraft of the need for (1) changing and correcting the actual flight path of the deviating aircraft and (2) changing the flight path of the following aircraft as necessary, if the deviating aircraft is a leading heavier aircraft, that has thus left wake vortexes in the path of the following, lighter aircraft. The Air Traffic Controllers 350 can issue Directives to Aircraft 370 specifying arrival speeds and tracks.

Figure 4:
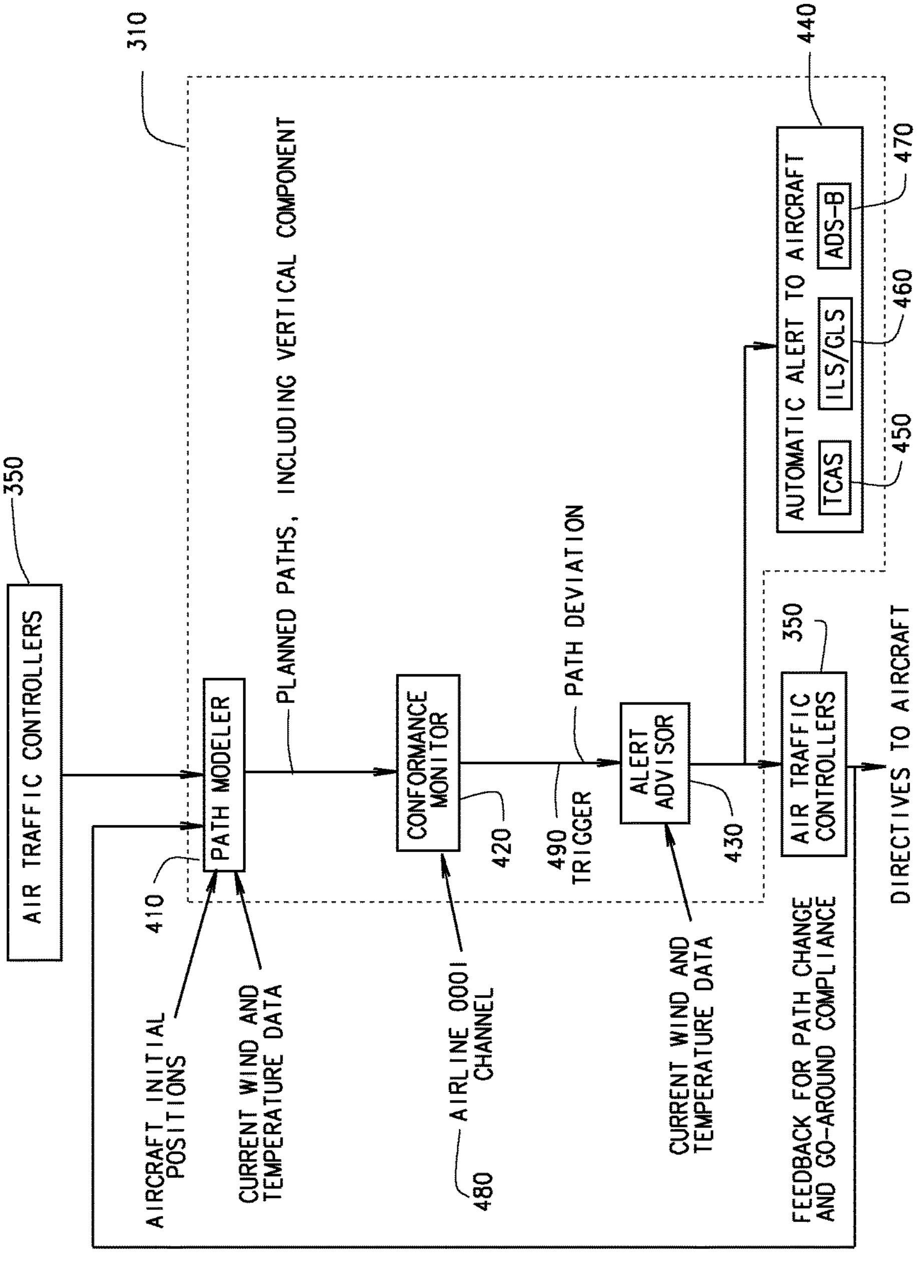
FIG. 4 is an illustration of a functional diagram of a the Conformance Monitoring System.

Referring to FIG. 4, the Approach and Landing Conformance Monitoring System 310 comprises a Path Modeler component 410, a Conformance Monitor component 420, an Alert Advisor component 430, and an Automatic Alert 440 to Aircraft component. In implementing the technology as disclosed, these components can be located in system on the ground or they can be on-board the arriving aircraft.

The Path Modeler component 410 is in communication with Air Traffic Controllers 350 and is configured to model a planned flight path, including the necessary vertical component, for each arriving aircraft at an airport from initial approach to landing using aircraft performance models and path simulators known in the art. The Path Modeler component 410 builds a geometric representation in three spatial dimensions of the flight path that each aircraft is directed into by Air Traffic Controllers 350 to follow from the beginning of the initial approach to the airport by the aircraft to touchdown. The Path Modeler component 410 can follow the assignment of each aircraft to a lower or upper flight path and can combine that with the assigned two-dimensional route over the ground (the "ground track"), to create a model of the planned flight path of the aircraft, which thus explicitly includes the vertical component of the flight path as well as the ground track. This model can be based on the waypoints that define the route that the aircraft is directed to follow and on the waypoint altitudes for the lower or the upper initial approach flight path, whichever is assigned to the aircraft. The segment of the model for the final approach and landing for each of the upper and lower flight paths, can be based on the known glide slope of the final approach to the runway and ground track.

Conformance Monitor component 420 is in communication with the Path Modeler 410 and is configured to perform the following functions: track aircraft; compare the actual flight path of an aircraft with modeled flight path; identify path deviations and trigger an alert; and detect weight of an aircraft on wheels (i.e. touchdown on the runway). The Conformance Monitor component 420 monitors the actual flight paths flown to identify potential wake encounters by lighter aircraft; that is, conflicts between predicted aircraft flight paths and the expected position of a wake vortex.

The Conformance Monitor component 420 can also acquire surveillance data from the Air Traffic Surveillance System 340, for example the exact location of the aircraft flying in the assigned paths. The surveillance data can be provided by secondary surveillance radar, which can have an update interval, for example six seconds.

Alternatively, surveillance updates can be provided by an Automatic Dependent Surveillance Broadcast (ADS-B) system, or other system, as part of the existing Air Traffic Surveillance System 340, that will receive position data broadcast by ADS-B transmitters on the aircraft. Surveillance of an aircraft during travel on the runway after landing is included in the input from the Air Traffic Surveillance System 340 to the Conformance Monitor component 420 and is received by an Aircraft Tracker function. A Path Comparator function continually compares the positions of the aircraft flying in their assigned flight paths upon approach to the airport and during final approach and landing with the planned paths produced by the Path Modeler component 410. If a deviation is detected, a Path Deviation Identifier function causes the Conformance Monitor component to send a trigger 490 for an alert to the Alert Advisor component 430 when the actual position of the aircraft is more than a preset distance above or below the planned path. Acceptable deviations are those that do not exceed the ceiling of the lower flight path and are not beneath the floor of the upper flight path.

The Alert Advisor component 430 is in communication with the Conformance Monitor component 420 and receives real time environmental information in the vicinity of the airport, for example current wind and temperature data. The Alert Advisor component 430 is configured to determine what type of alert to issue, sends alert advisories to the Air Traffic Controllers 350 and to pilots of deviating aircraft. The Alert Advisor component 430 further includes a Wake Propagation Modeler function for predicting the positions of wakes that have been generated by an aircraft that has deviated from its assigned path, to determine if those wakes may be encountered by other incoming aircraft, particularly those of lighter weight, and whether the Alert Advisor component 430 needs to issue an alert for a go around directive to Air Traffic Controllers 350. In addition, the Alert Advisor component 430 is configured to issue path change advisories, to direct respective incoming aircraft to a new, corrected flight path when an aircraft has deviated from its path. The alerts can include three types of alerts: an alert when a heavier aircraft on the lower flight path flies above the ceiling of its modeled flight path, an alert when a lighter aircraft on the higher flight path flies below the floor of its modeled flight path, and/or a go-around alert when a leading aircraft executes a mixed approach. These alerts are critical because such "out of bounds" excursions may create a situation in which the lighter aircraft on the upper path could encounter the wake of a preceding heavier aircraft flying the lower path. The Alert Advisor component 430 is also configured to issue instructions to an Automatic Alert to Aircraft component 440 discussed in detail below.

In another implementation of the technology, the Conformance Monitor component 420 can dynamically adjust the boundaries it applies for flight path deviation alerts by using the Wake Propagation Modeler of the motion of the wake vortexes to determine the safe boundaries for flight paths under the specific atmospheric conditions. The default boundaries can be set for worst-case conditions, and the boundaries can be adjusted as conditions warrant, to preclude otherwise unnecessary ("false") alerts. With strong headwinds or crosswinds which can dissipate wake vortexes, the boundaries can be widened, and similarly for light tailwinds, the boundaries can be narrowed.

In the event of a deviation of an aircraft from its assigned flight path, the Conformance Monitor component 420 triggers the Alert Advisor component 430 to send an alert to the Air Traffic Controllers 350 and directly to the pilots, via a pilot interface or audible alert through the Automatic Alert to Aircraft component 440. The alert to Air Traffic Controllers 350 may be audible or visual, with color changes or flashing, for instance, of the aircraft depictions on the radar screen created by a function that creates alert flags for controller displays, or both. The Alert Advisor component 430 may also include a Path Change Advisory function that creates a flight directive advisory to accompany the alert sent to the Air Traffic Controllers 350. As is usual for any directive, the Air Traffic Controllers 350 can communicate to the aircraft by voice over the radio.

By way of illustration, in the event that a heavier aircraft deviates above the ceiling of its assigned, lower flight path, the Alert Advisor component 430 can notify Air Traffic Controllers 350 to provide an advisory instruction to the pilot to descend to the aircraft's assigned flight path, and another instruction to the pilot of the following lighter aircraft on the upper path, to temporarily fly above its assigned flight path, for an appropriate distance. If the heavier aircraft is too close to the runway for a safe correction downward, an instruction for path change would only be sent to the following lighter aircraft, usually to execute a missed approach.

A missed approach is when an aircraft does not complete its landing and executes a "go around," pulling up and climbing away from its planned approach path to the runway. A missed approach may occur because the aircraft is not stabilized on a steady glide slope to the runway or is not flying at a proper landing speed. This will leave a wake directly in the path of a lighter following aircraft flying on the upper path, unless there is a significant cross-wind. When a missed approach is in progress, the Approach and Landing Conformance Monitoring System 310 can monitor vertical separation between the paths of the aircraft that had to go around and any following aircraft, that as a result may also have to go around, in order to guide each aircraft that had to execute a go around, into the appropriate upper or lower flight path by weight category, as needed, and to maintain the necessary vertical separation between the paths on the aircraft's return. After an alert, a following lighter aircraft can be instructed by the Air Traffic Controllers 350 climb and follow a path that stays above the go-around path of a heavier aircraft, to maintain the vertical separation that had been between the respective flight paths while descending toward the runway.

If a lighter aircraft on the upper path is flying too low, i.e. beneath the floor of its assigned flight path, an alert will be issued by the Alert Advisor component 430 to caution the pilot of a heavier aircraft on the lower flight path of potential wake turbulence, and to instruct the lighter aircraft in the upper path to immediately resume its intended flight path. Where a heavier aircraft on the lower flight path executes a missed approach, and a following lighter aircraft on the upper path is directed also to execute a missed approach, the Conformance Monitor component 420 can monitor the path of the following lighter aircraft and trigger the Alert Advisor component 430 to issue a second alert if that lighter aircraft does not execute the missed approach procedure.

In an implementation of the technology, the onboard communication system of each aircraft can include a component that executes a transmission of a signal to the Air Traffic Surveillance System 340 indicative of a missed approach procedure being executed by one or both of a leading heavier and following lighter aircraft. The leading heavier aircraft can send a transmission to the Air Traffic Surveillance System 340 and to the lighter aircraft containing a notice of the missed approach. The lighter aircraft can confirm to the Air Traffic Surveillance System 340 that it has received notice. This can provide additional safety, if the pilot of the leading heavier aircraft does not or is unable to notify the Air Traffic Controllers 350, for example by using the radio that he/she is executing a missed approach. In one implementation, if a missed approach has been received by the Air Traffic Surveillance System 340 and communicated to and logged by the Conformance Monitor component 420 for a leading, heavier aircraft, but a missed approach notice is not subsequently received by the Air Traffic Surveillance System 340 for the following lighter aircraft within a specific time constraint, Air Traffic Controllers 350 can be issued an alert advisory by the Alert Advisor component 430. The Air Traffic Controller's 350 responsibility will then be to attempt to contact the following lighter aircraft and inform it of the missed approach of the leading, heavier aircraft and direct it to also go around, as necessary. In one implementation for the missed approach procedure, an Automatic Alert to Aircraft communication 440 can be sent to the following, lighter aircraft as a back up to the verbal communication from Air Traffic Controllers 350.

In addition to Air Traffic Controllers 350 manually alerting pilots of aircraft, there are various methods with which the Alert Advisor Component 430 can implement an automatic alert to aircraft 440 (FIG. 4), using avionics currently deployed in aircraft capable of operating under IFR. The Automatic Alert to Aircraft component 440 may be a system such as or similar to a traditional TCAS 450, ILS or GLS 460, or an ADS-B 470.

One implementation can use the Traffic Collision Avoidance System (TCAS) 450 on the aircraft to issue an advisory to the pilot. Specifically, when the aircraft is far out on the final approach and still at more than 1000 ft. in altitude, this can be implemented by triggering a standard TCAS resolution advisory (RA) for the aircraft to climb. When the aircraft is close in on final approach and below 1000 ft. in altitude (thus the TCAS RA function is disabled by design), a traffic advisory (TA) can be given, for which in this specific circumstance pilots could be trained to respond by executing the missed approach procedure.

The means for causing TCAS 450 to issue the RA or TA can be the installation (as part of the Automatic Alert to Aircraft component 440) of a pseudo TCAS unit near the runway with its own identifier code. It can be programmed to determine the timing of the aircraft's TCAS interrogations and to respond with replies at the appropriate timing to spoof the TCAS 450 on the aircraft into seeing a phantom target with which the aircraft ostensibly would collide within 20 seconds, thereby triggering the RA, or the TA below 1000 ft. With a second set of responses, this pseudo TCAS operation can also cause the aircraft TCAS 450 to show on its traffic display the expected position of the wake left by the preceding aircraft as it pulled up into its go around.

In another implementation of the technology, the ILS, GLS, or other guidance system 460 providing the guidance for the final approach glide slope for an aircraft flying in an upper path can be modified to accept an instruction from the Alert Advisor component 430 to issue an alert that the guidance is inaccurate and to suspend the guidance signal. The conventional response to suspension of a guidance signal on board the aircraft is to declare a missed approach and go around.

The issuance of an automatic alert for a missed approach can also be a function of ADS components 470. In an implementation, an ADS-B In (receiving) component 470 is located on the aircraft and an ADS-B Out (transmitting) component is located on the ground at the airport. When an alert is issued, the transmitter can emit ADS-B Out signals specifying the location of the wake that is a potential hazard, to the ADS-B In component on the following lighter aircraft on the upper flight path. The automatic alert can alert a following lighter aircraft in the event the leading heavier aircraft executes a go around and the Air Traffic Controllers cannot or do not issue a go-around directive to the lighter aircraft.

The Conformance Monitor component 420 can also detect an aircraft touchdown on the runway beyond the normal landing zone after the landing threshold ("long landing"), for the aircraft flying in the lower path. A path comparator function of the Conformance Monitor component 420 can include the location of expected touchdown, which it receives from the Path Modeler 410, and an Aircraft Tracker function can use the information obtained from the Air Traffic Surveillance System 340 to determine the location at which the aircraft touches down on the runway. In addition to using radar and/or ADS-B Air Traffic Surveillance 340 to track the aircraft position, the Conformance Monitor component 420 may connect to the airlines' data systems to obtain the "Out-Off-On In" (OOOI) signals automatically sent by an aircraft over its airline communication radio link. The "On" signal is triggered by weight-on-wheels sensors on the aircraft that send data to the airline's operation center indicating that the aircraft has touched down, and this signal is linked through the Airline OOOI channel 480 to the Conformance Monitor component 420. The weight on wheels function can receive from the Airline OOOI channel 480 an indication of when touchdown actually occurs, and with this data the aircraft tracking function can determine where the wake vortexes terminate. If a landing and the wake vortex termination occur beyond the bounds of the planned landing zone, the Conformance Monitor 420 can communicate to the Alert Advisor component 430 a trigger for the Alert Advisor component 430 to initiate a specific alert.

For a long landing by an aircraft on the lower flight path, the functions of Alert Advisor component 430 can be the same as for a missed approach executed by that aircraft. However, in one implementation the Alert Advisor component 430 determines the need for an aircraft to go and can apply an aircraft trajectory simulator to determine whether the environmental conditions at the airport, for example, strong winds, and visibility at the runway, permit the following lighter aircraft to continue safely, by revising its close-in final approach to fly above the upper flight path glide slope and/or land beyond the upper flight path normal landing zone. The latter can be determined also by the runway length and the braking conditions.

Figure 5:
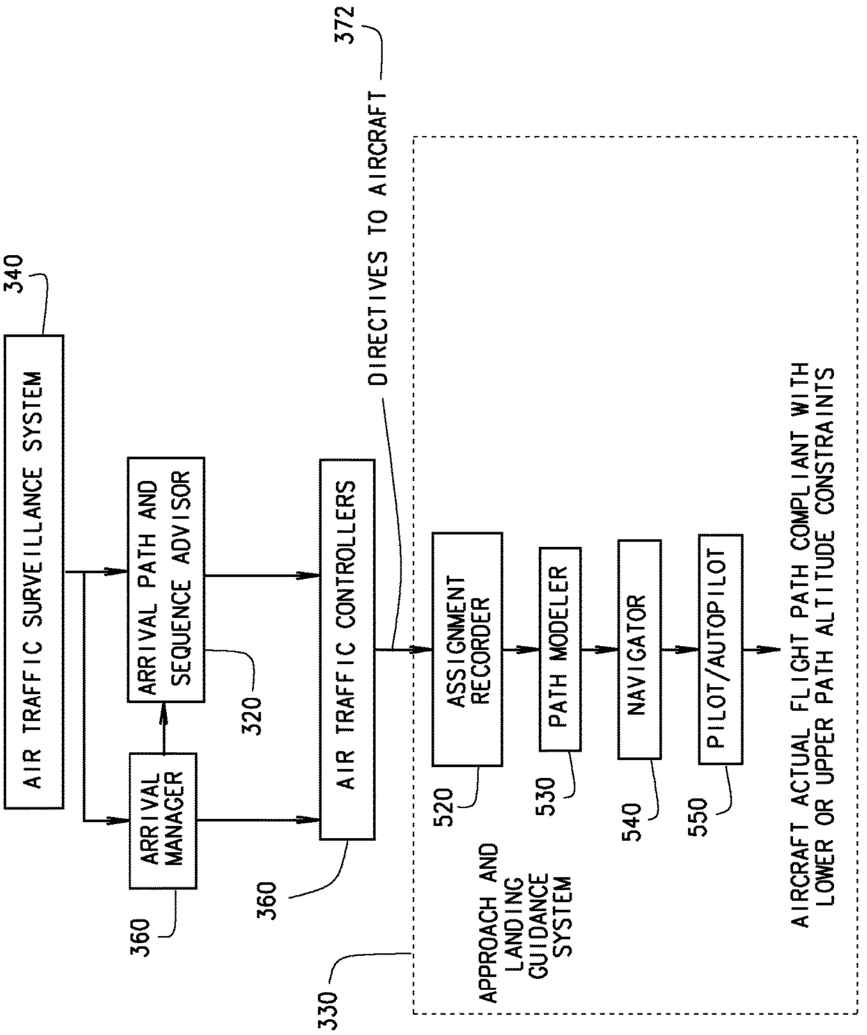
FIG. 5 is an illustration of a functional diagram of an Arrival Path and Sequence Advisor and Initial Approach or Approach and Landing Guidance System.

FIG. 5 depicts the Air Traffic Surveillance System 340 from FIG. 3 that includes an Arrival Path and Sequence Advisor component 320 discussed above, and an Approach and Landing Guidance System 330. The Approach and Landing Guidance System 330 located on-board an aircraft can include an Assignment Recorder component 520, a Path Modeler component 530, a Navigator component 540, and a Pilot/Autopilot component 550. These components may be components currently used in existing aircraft flight management systems (FMS). With the technology as disclosed, they can be configured to cause an aircraft to fly, as directed, a lower flight path or an upper flight path, such that the actual path flown by the aircraft is vertically separated from the path flown by another aircraft having the same components, that is directed to fly the other path of the pair of lower and upper flight paths.

The Assignment Recorder 520 can be configured to receive transmissions from the Air Traffic Controllers 350 containing Directives to Aircraft 370 specifying arrival speeds and tracks (to establish the aircraft arrival sequence) and also initial and final approach flight paths, whether lower or upper. The transmissions can be sent by the Air Controllers 350 for example by verbal communication to the pilot and transcribed to the Assignment Recorder 520 or by data directly to the Assignment Recorder 520, which can retain the transmissions in digital memory. The transmitted specifications of the paths can be geometric data or a label that references specific geometric data stored in an on-board database, which can be retrieved by the Assignment Recorder 520. The data designate both the route (i.e., the ground track) and the altitude profile that the path follows.

The Path Modeler 530 can create a continuous three dimensional mathematical representation of the flight path and can communicate that representation to the Navigator 540. The Navigator 540 continuously determines the aircraft position using GPS signals and, in many aircraft, an inertial navigation system, or using other existing technical means, and can apply certain functions resident in the flight management system—namely, area navigation (RNAV), required navigation performance (RNP), and vertical navigation (VNAV) to compare the aircraft position with the mathematical representation of the flight path to create steering guidance for the Pilot or Autopilot 550 to use to fly the aircraft along the directed flight path. For the Pilot, steering guidance is portrayed on existing instrument displays in the cockpit.

In an implementation, the Approach and Landing Guidance System 330 may have multiple angles of descent. The Approach and Landing Guidance System 330 is located on-board an aircraft and may comprise an Assignment Recorder component 520, a Path Modeler component 530, a Navigator component 540, and a Pilot or Autopilot component 550. These components may be components in existing aircraft precision landing guidance systems such as GLS and LPV. Referring also to FIG. 1, with the technology as disclosed, these components can be configured to cause an aircraft to fly, as directed, a lower final approach path 100 to a normal landing threshold and landing zone or an upper final approach path 101 with a steeper glide slope (i.e., greater angle of descent 141) than that 140 of the lower path to a displaced threshold and landing zone, such that the actual flight path flown by the aircraft is vertically separated, with the amount of separation 131 decreasing from the beginning of the final approach to the landing, from the flight path flown by another aircraft having the same components that is directed to fly the other path of the pair of lower and upper final approach flight paths.

The Assignment Recorder component 520 can be configured to receive transmissions from Air Traffic Controllers 350 containing Directives to Aircraft 370 specifying final approach flight paths, whether lower or upper. The transmissions can be sent by voice to the pilot and transcribed to the Assignment Recorder component 520 or by data directly to the Assignment Recorder 520, which can retain the transmissions in digital memory. The transmitted specifications of the paths can be geometric data or a label that references specific geometric data stored in an on-board landings database, which can be retrieved by the Assignment Recorder 520. The data designate both the route for the final approach (i.e., the ground track), which can be entirely straight in or can be curved before a short segment prior to landing, and the glide slope that the path follows. The Path Modeler 530 can create a continuous mathematical representation of the path and can communicate that representation to the Navigator 540. The Navigator 540 continuously determines the aircraft position relative to the runway with high precision using GPS signals and, in many aircraft, an inertial navigation system, or using other existing technical means, and can compare the aircraft position with the path mathematical representation to create steering guidance for the Pilot or Autopilot 550 to use to fly the aircraft along the directed path. For landing using GLS or LPV, the GPS signals used for navigation are augmented for higher aircraft position accuracy and integrity by signals from a ground-based augmentation system (GBAS) in the case of GLS or from a satellite wide-area augmentation system (WAAS) in the case of LPV. For the Pilot, the steering guidance is portrayed on existing instrument displays in the cockpit.

The Multiple Thresholds Aircraft Arrival System 300 can include Advanced Automation. Advanced Automation can include a multi-element refinement to the information communications described above. The Advanced Automation can be enabled by the deployment of an air-ground datalink capable of sending complex directives (4D path, speed, and timing instructions for many waypoints, in digital format) from Air Traffic Controllers 350 to aircraft in flight that can be loaded directly into the FMS by a pilot. This implementation may connect the Arrival System 300 to the air traffic Controller-Pilot Data Link Communications (CPDLC) network, that is in development by the FAA, and may include the following additional components of the present aircraft arrival system: (1) a complex directives generator to the Arrival Path and Sequence Advisor Component 320 that creates complex directives for delivery to aircraft by Aircraft Traffic Controllers 350 using CPDLC; (2) incorporating downlinked aircraft flight path intent information obtained from the FMS in the Path Modeler component 410, (3) running a four dimensional ("4D," including time) path compliance analysis in the Path Comparator function, and (4) augmenting the Alert Advisory component 430 to alert Air Traffic Controllers 350 and pilots specifically of nonconformance with planned 4D aircraft flight paths.

The complex-directives generator can create a complete approach to landing for each flight, normally before an aircraft begins to descend from cruise altitude for approach to an airport. This is dynamically created from the landing order specified by the Arrival Manager 360 as revised by the optimal sequence function determined by the algorithm as described above, the current wind grid for the terminal area, the lower and upper flight path assignment, and the minimum safe lateral and vertical separations determined dynamically for the environmental conditions.

The approach and landing complex directives can be provided to Air Traffic Controllers 350 for uplink by CPDLC to the aircraft. The current wind data for the aircraft flight path, on which the clearance is based, can also be uplinked. When the pilots load the complex directives into the FMS, the resulting flight path intent can be downlinked by CPDLC to the Path Modeler 410, where it is checked for compliance with the directives—in lateral track, altitude profile, and timing. The Conformance Monitor 420 can continuously check for conformance with the planned flight path, while also continuing with the monitoring of the basic vertical ceilings and floors of each flight path for preventing wake encounters. In the event of a nonconforming 4D trajectory, the alert issued by the Alert Advisor component 430 can specify what manual corrections should be made to avoid a deviation across the upper or lower path boundaries and/or to maintain the required longitudinal spacing.

The Multiple Landing Threshold Aircraft Arrival System 300 can monitor conformance highly accurately by using downlinked data from the aircraft FMS as well as current wind for the specific path of the paired procedures. Optimized continuous descents tailored by weight category can be combined with dual threshold arrivals for mixed-weight traffic landing on one runway. The technology provides redundant mechanisms to (1) assure in poor visibility that a lighter following aircraft is notified when a leading, heavier aircraft deviates from its planned flight path and (2) monitor that the following aircraft responds appropriately and avoids the wake of the leading aircraft.

The methods described herein do not have to be executed in the order described, or in any particular order. Moreover, various activities described with respect to the methods identified herein can be executed in serial or parallel fashion. In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

Certain systems, apparatus, applications or processes are described herein as including a number of modules or components. A module or component may be a unit of distinct functionality that may be presented in software, hardware, or combinations thereof. When the functionality of a module is performed in any part through software, the module includes a computer-readable medium. The modules may be regarded as being communicatively coupled. The inventive subject matter may be represented in a variety of different implementations of which there are many possible permutations.

In an example implementation, the Multiple Landing Threshold Aircraft Arrival System as disclosed, can operate as a standalone system or may be connected (e.g., networked) to other devices. Components of the Multiple Landing Threshold Aircraft Arrival System can be on the ground and/or on board aircraft. In a networked deployment, the components may be computers that operate in the capacity of a server or a client computer in server-client network environment, or as a peer computer system in a peer-to-peer (or distributed) network environment. The Multiple Landing Threshold Aircraft Arrival System can be a standalone on-board aircraft navigation system or it can be networked to a land based system. The System may be a single device or multiple devices that individually or jointly execute a set (or multiple sets) of instructions to perform any one or more of the procedures described herein. The System may include a server computer, a client computer, a personal computer (PC), a tablet PC, a set-top box (STB), a Personal Digital Assistant (PDA), a cellular telephone, a web appliance, a network router, switch or bridge, or any device capable of executing a set of instructions (sequential or otherwise) that specify actions to be taken by that device. The System can include a processor (e.g., a central processing unit (CPU) a graphics processing unit (GPU) or both), a main memory and a static memory, which communicate with each other via a bus. The computer system may further include a video/graphical display unit (e.g., a liquid crystal display (LCD) or a cathode ray tube (CRT)). The System can also include an alphanumeric input device (e.g., a keyboard), a cursor control device (e.g., a mouse), a drive unit, a signal generation device (e.g., a speaker) and a network interface device. The drive unit may include a computer-readable medium on which is stored one or more sets of instructions (e.g., software) embodying any one or more of the methodologies or systems described herein. The software instructions as disclosed herein modify the operation of the Flight Management Computing System resulting in a modification of the pilot interface systems and management of the aircraft navigation systems. The software may also reside, completely or at least partially, within the main memory and/or within the processor during execution thereof by the computer system, the main memory and the processor also constituting computer-readable media. The software may further be transmitted or received over a network via the network interface device.

The term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by computers and that cause the computers to perform any one or more of the methodologies of the present implementation. The term "computer-readable medium" shall accordingly be taken to include, but not be limited to, solid-state memories, optical media and magnetic media.

The Multiple Landing Threshold Aircraft Arrival System uses new modules and interfaces with current hardware to achieve a new and different result. The various examples shown above illustrate a Multiple Landing Threshold Aircraft Arrival System and method. A user of the present technology as disclosed may choose any of the above implementations, or an equivalent thereof, depending upon the desired application. In this regard, it is recognized that various forms of the subject dual thresholds system and method could be utilized without departing from the scope of the present technology as disclosed.

As is evident from the foregoing description, certain aspects of the present technology as disclosed are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the scope of the present technology as disclosed and claimed.

The system and method facilitates certification of dual thresholds approaches for implementation by addressing the key safety issues, by avoiding an increase in controller workload, and by eliminating a requirement for additional approach routes in the terminal airspace. An impact of the technology can be an increase the capacity and efficiency of the air traffic system. The system provides a way of increasing runway capacity at the busiest airports. Other aspects, objects and advantages of the present technology as disclosed can be obtained from a study of the drawings, the disclosure and the appended claims.

What is claimed is:

1. A Multiple Landing Threshold Aircraft Arrival system for landing aircraft of different weight categories on a single runway during initial, intermediate and final approach comprising:

an Approach and Landing Conformance Monitoring System component configured to determine conformance or deviance of aircraft from flight paths assigned to them and to alert operators of deviance of aircraft from an assigned flight path;

an Approach Guidance System component configured during initial approach to the airport to fly a leading heavier aircraft on a lower flight path such that the actual path flown by the aircraft is vertically separated from the path flown by another following lighter aircraft flying on the upper path of the pair of lower and upper paths; and said Approach Guidance System component configured during final approach and landing to direct a leading heavier aircraft to fly a lower final approach flight path to a landing threshold for that aircraft or a following lighter aircraft to an upper final approach flight path with a glide slope the same as or steeper than that of the lower flight path to a displaced landing threshold, such that the actual flight path of each aircraft is vertically separated from the path flown by another aircraft having the same components that is directed to fly the other path of the pair of lower and upper final approach flight paths.

2. The Multiple Landing Threshold Aircraft Arrival system as recited in claim 1, wherein the Approach and Landing Conformance Monitoring System component comprises:

a Path Modeler component configured to receive runway threshold assignments for an aircraft approaching an airport, based on aircraft weight category, and configured to determine a planned path of each aircraft, including the vertical guidance component of the path; and a Conformance Monitor component operatively connected to the Path Modeler component and configured to determine a conformance or a deviation of the approaching aircraft from a predetermined planned vertical path for the aircraft during approach.

3. The Multiple Landing Threshold Aircraft Arrival System of claim 2, further comprising:

an Alert Advisor component operatively connected to the Conformance Monitor component and configured to initiate one or more alerts to a following aircraft regarding deviation of a leading aircraft from its planned vertical path and configured to determine aircraft path corrections and advise of needed path corrections.

4. The Multiple Landing Threshold Aircraft Arrival System of claim 3, further comprising:

an Automatic Alert to Aircraft component configured to automatically provide alerts to aircraft.

5. The Multiple Landing Threshold Aircraft Arrival System of claim 1, wherein the Approach and Landing Guidance System comprises:

an Assignment Recorder component on an aircraft configured to receive transmissions from Air Traffic Controllers containing directives to aircraft specifying arrival speeds and tracks to establish the aircraft arrival sequence and also containing initial and final upper and lower approach paths;

a Path Modeler component on the aircraft configured to receive runway threshold assignments based on aircraft weight category, and configured to determine a planned flight path of the aircraft, including the vertical guidance component of the path;

a Path Navigator component on the aircraft operatively connected to the Path Modeler component and configured to continuously determine aircraft position and compare the aircraft position with the mathematical representation of the flight path to create steering guidance for flying the aircraft along the directed flight path; and a Pilot/Autopilot component on the aircraft operatively connected to the Path Navigator component and configured to follow the steering guidance for flying the aircraft along the directed flight path.

6. The Multiple Landing Threshold Aircraft Arrival System of claim 3, wherein the Alert Advisor component is configured to issue a missed approach alert to a following lighter aircraft based on a missed approach of a leading aircraft.

7. The Multiple Landing Threshold Aircraft Arrival System of claim 3, wherein the Alert Advisor component includes a wake propagation modeler, operatively connected to the Conformance Monitor component and Alert Advisor component, and configured to modify the Alert Advisory component to adjust for wake propagation using current atmospheric conditions.

8. The Multiple Landing Threshold Aircraft Arrival System of claim 1, further comprising:

an Arrival Path and Sequence Advisor component configured to assign arriving pairs of aircraft appropriately by weight to lower and upper flight paths and order them for optimal spacing between arriving aircraft for landing sequentially on a single runway.

9. The Multiple Landing Threshold Aircraft Arrival System of claim 8, wherein the Arrival Path and Sequence Advisor component is further configured to advise clearances for each aircraft's speed along an upper or lower path depending on aircraft weight category during approach to the airport.

10. A Multiple Landing Threshold Aircraft Arrival System for landing aircraft of different weight categories on a single runway comprising:

a Final Approach and Landing Conformance Monitoring System component configured to determine conformance or deviance of an aircraft from an assigned flight path and to alert operators of deviance of an aircraft from an assigned flight path; and a Final Approach and Landing Guidance System component configured to direct a leading heavier aircraft to fly a lower final approach flight path to a landing threshold for that aircraft or a following lighter aircraft to an upper final approach flight path with a glide slope the same as or steeper than that of the lower flight path to a displaced landing threshold, such that the actual flight path of each aircraft is vertically separated from the path flown by another aircraft having the same components that is directed to fly the other path of the pair of lower and upper final approach flight paths; and an Alert Advisor component operatively connected to the Conformance Monitor component and configured to initiate one or more alerts regarding deviation of a leading aircraft from its planned vertical path and configured to determine aircraft path corrections and advise of the need for path corrections.

11. The Multiple Landing Threshold Aircraft Arrival System of claim 10, further comprising:

an Arrival Path and Sequence Advisor component configured to assign arriving pairs of aircraft appropriately by weight to lower and upper flight paths and order them for optimal spacing between arriving aircraft for landing sequentially on a single runway.

12. The Multiple Landing Threshold Aircraft Arrival System of claim 10, wherein the Final Approach and Landing Guidance System further comprises:

a Path Modeler component configured to receive runway threshold assignments for an aircraft approaching an airport, based on aircraft weight category, and configured to determine a planned path of the aircraft, including the vertical guidance component of the path; and a Conformance Monitor component operatively connected to the Path Modeler component and configured to determine a conformance or a deviation of the aircraft from a predetermined planned vertical path for the aircraft during approach.

13. A method for landing aircraft at multiple landing thresholds on a single runway comprising:

defining pairs of upper and lower flights paths for aircraft of different weight categories landing sequentially on a single runway and assigning aircraft of different weight categories to the upper and lower flight paths using an Arrival Path and Sequence Advisor component and information obtained from Air Traffic Controllers;

directing on initial approach to a runway, a leading heavier aircraft to a lower flight path, and a following lighter aircraft to a higher flight path, such that the actual path flown by the aircraft is vertically separated from the path flown by the, following lighter aircraft flying on the upper path using an Initial Approach Guidance System;

directing on final approach to a runway, a leading heavier aircraft on a lower flight path to a normal landing threshold on the runway for that aircraft and directing a following lighter aircraft to an upper flight path having a glide slope the same as or steeper than that of the lower flight path, to a displaced landing threshold on the runway, such that the actual flight path of each aircraft is vertically separated, using a Final Approach and Landing Guidance System component; and determining conformance or deviance of aircraft from the assigned flight paths and alerting operators of deviance of an aircraft from an assigned flight path using an Approach and Landing Conformance Monitoring System component during initial and final approaches.

14. The method of claim 13, further comprising;

alerting, using an Alert Advisor component that receives information from the Approach and Landing Conformance Monitor, a following lighter aircraft regarding deviation of a leading aircraft from its planned vertical path;

determining, using the Alert Advisor component the required aircraft flight path corrections; and advising the leading and following aircraft of the path corrections.

15. The method of claim 13, further comprising:

receiving the path deviation alert and causing the Traffic Collision Avoidance System (TCAS) on the following aircraft to issue a resolution advisory or a traffic advisory.

16. The method of claim 13, wherein the path deviation is a go around executed by the leading aircraft.

17. The method of claim 13, wherein a pair of paths include a lower path for heavier aircraft, which follows the path that concludes at the landing threshold nearest an approach end of a runway and a higher path of lighter aircraft, which follows the path that concludes at a threshold displaced down the runway, some distance from the landing threshold for the lower path, and wherein the flight paths established create identical lateral tracks for the procedures in a pair, and establishes at or below altitudes along a lower path and at or above altitudes along a higher path that maintain the minimum vertical separation determined by a safety criteria for wake avoidance.

18. The method of claim 13, wherein the step of alerting comprises alerting a following aircraft to a missed airport approach by a leading aircraft so that the following aircraft avoids encountering a wake of the leading aircraft.

* * * * *